United States Patent [19]

Ellenberger et al.

[11] Patent Number: 4,744,855

[45] Date of Patent: May 17, 1988

[54] WELDING MACHINE FOR FOIL WEBS

[75] Inventors: Bernd Ellenberger, Gonbach; Karlheinz Schäfer, Neustadt; Paul Reinheimer, Kindsbach, all of Fed. Rep. of Germany

[73] Assignee: Pfaff Industriemaschinen GmbH, Fed. Rep. of Germany

[21] Appl. No.: 879,200

[22] Filed: Jun. 26, 1986

[30] Foreign Application Priority Data

Oct. 12, 1985 [DE] Fed. Rep. of Germany ... 8529090[U]

[51] Int. Cl.$^4$ .............................................. B44C 7/00
[52] U.S. Cl. .................. 156/499; 156/579; 280/111; 280/638
[58] Field of Search ............... 156/497, 499, 579, 82; 280/111, 47.34, 638

[56] References Cited

U.S. PATENT DOCUMENTS

| | | | |
|---|---|---|---|
| 3,163,438 | 12/1964 | Bliss | 280/638 X |
| 3,881,564 | 5/1975 | Bass et al. | 280/638 X |
| 3,917,922 | 11/1975 | Kirsch | 156/579 X |
| 4,440,588 | 4/1984 | Stevenson et al. | 156/497 X |
| 4,447,288 | 5/1984 | Seaman | 156/499 X |

Primary Examiner—David Simmons
Attorney, Agent, or Firm—McGlew and Tuttle

[57] ABSTRACT

A welding machine for foil webs which are overlapped comprises an undercarriage which includes a rectangular frame having longitudinal frame members and laterally adjustable transverse frame members with wheels supporting the frame. A welding device is positioned on the frame and it in the frame includes centering elements which may be adjustable so as to position the welding device accurately in respect to the frame. The welding device itself advantageously includes slots extending inwardly from each side into which a respective foil end is positioned and roller means which engage with one of the foils for guiding it as the undercarriage is moved over the top of the respective foils to be welded together. The undercarriage during the welding device includes a drive from the wheels to the rollers which includes a shaft assembly having a plurality of universal joints. The front of the undercarriage carries a guide which projects forwardly thereof and the front edge of the welding machine includes a caster which is engageable with a wall element in the event that the device is to be used for vertical welding. By the arrangement of two rollers on at least one pivotable roller carrier these rollers can always jointly adapt themselves to any unevennesses of the terrain, so that the rollers correlate with one another in pairs take support on the foil strips with substantially equal contact force both in the case of level and of uneven supports. In this manner a uniform and direction-stable forward movement is obtained.

23 Claims, 4 Drawing Sheets

WELDING MACHINE FOR FOIL WEBS

FIELD AND BACKGROUND OF THE INVENTION

This invention relates in general to welding devices and in particular to a new and useful combination of welding device and undercarriage which permits the welding of foil sheets which are guided in slots on each side of the welding device carried by the undercarriage.

Such a welding machine similar to the invention is known from German Patent No. 27 00 971. In this welding machine, the welding device containing the welding tools and an undercarriage including a frame and two wheels form one solid structural unit. The welding machine is designed so that the wheels run not on the base supporting foil webs to be welded, but on a lower foil web and the lower welding tools grip under the lower foil web in an overlap area, thus forming a bearing surface independent of the base. This makes the welding machine particularly well suited for work on foil webs laid out on an uneven base. But on account of the great weight of the welding machine it can be handled only with great difficulty, when work in a vertical plane or overhead is to be performed, so that it is unsuited for making welding seams on tunnel linings, for example.

The invention provides a welding machine suited for work in both a horizontal and a vertical plane or for overhead work.

Through the measure of detachably connecting the welding device to the undercarriage it can be used selectively with or without an undercarriage. Therefore, if work in a vertical plane or overhead work is to be performed, the weight to be handled can be reduced substantially by removing the undercarriage.

By making the undercarriage height adjustable it is possible to increase the ground clearance of the welding device if the base is especially uneven.

A particularly simple holding means for the welding device comprises a supporting screw connection.

The undercarriage includes a frame with four wheels having the advantage over the known machine, which contains only two wheels, that the machine does not have to be secured against tipping over. One wheel is drivable so that it is possible, in conjunction with a tiltproof design with four wheels that the welding machine can, under certain circumstances, perform the welding operation automatically. The spacing of the wheels is adjustable so that the lateral distance between the wheels and the welding tools can be increased when processing thick or still foil webs, so that the foil web angle between the wheels and the welding tools located higher can be kept flatter. The transversely extending rods are advantageously extensible or retractable for the alteration of the mutual lateral spacing of the wheels.

The undercarriage advantageously includes an obliquely extending roller of the upper foil web so that it is possible to exert such a lateral aligning force upon the upper foil web during the feed motion of the welding device so that the overlap width chosen when laying out the two foil webs to be joined to each other is increased rather than decreased, even under unfavorable circumstances. This assures that the welding seam has a sufficiently great lateral distance from the two web edges everywhere.

By the development according to the invention it is possible, when processing thick or stiff foil strips, to increase the lateral distance between the rollers and the welding tools, whereby the angle of the foil strips between the rollers and the higher lying welding tools can be made flatter. The invention also provides a simple form of realization for varying the mutual lateral distance of the rollers.

The measure according to the invention in which the chassis has an upper foil strip in the form of obliquely set guide rollers it is possible to exert on the foil strip, during the forward movement of the welding apparatus, a lateral straightening (or aligning) force such that the overlap width chosen in laying out the two foil strips to be joined together is rather increased than reduced even under unfavorable circumstances. It is ensured in this way that the weld seam has everywhere a sufficiently great lateral distance from the two strip edges.

By the measure according to which there is a guide edge on the chassis for the foil strips an overlap width of the foil strips uniform over the entire length of the weld seam and hence an always equally wide weld seam can be obtained.

Accordingly it is an object of the invention to provide a welding device for welding machines for operating on foil webs which have edges which are overlapped and wherein the welding device itself is carried on an undercarriage in a manner so that it may be detachably connected to the undercarriage.

A further object of the invention is to provide a welding device which includes an undercarriage made up of a rectangular frame assembly supported on wheels at least one of which has a drive through the welding device for guiding respective edges of foils which are to be overlapped and welded.

A further object of the invention is to provide a welding machine which includes a welding device adjustably carried by an undercarriage which is advantageously height adjustable and in which the device is mounted on supporting screws of the undercarriage which may be adjusted and wherein one of the wheels of the undercarriage is drivable and the spacing between the wheels is adjustable at least laterally by adjusting the transverse members of the frame and wherein the undercarriage includes a front portion having a guide roller for the upper one of the foil webs which are guided through the welding device.

A further object of the invention is to provide a welding machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 3:
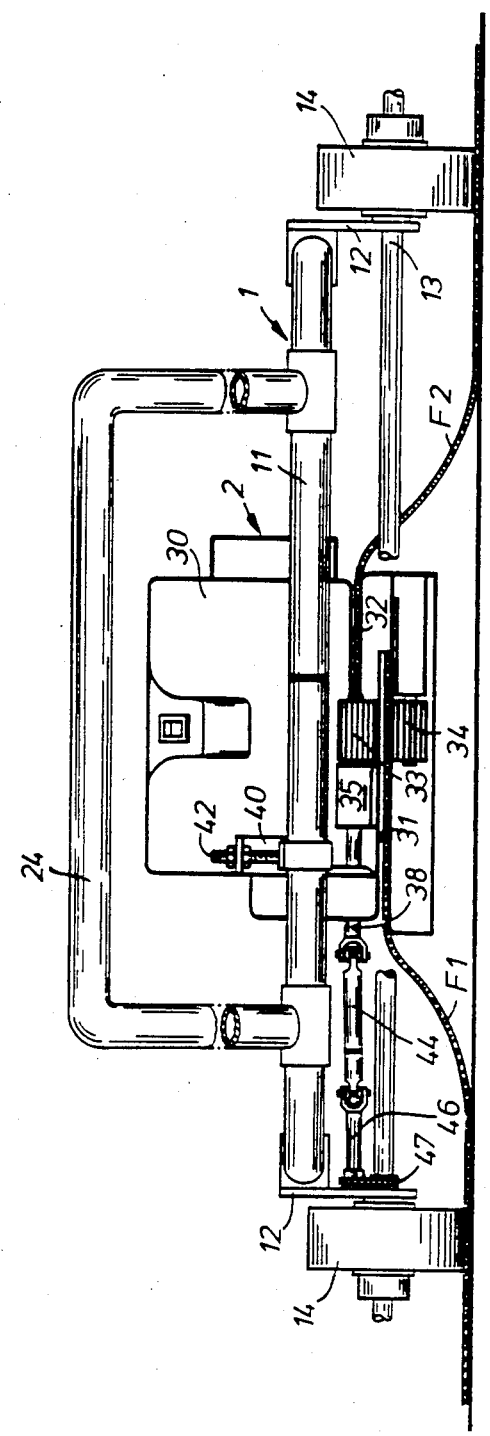
FIG. 3 is a front elevational view of the welding machine.

Referring to the drawings in particular, the invention embodied therein comprises a welding machine for welding foil webs F1 and F2 as shown in FIG. 3 which have edges which are guided into slots 31 and 32 on respective sides of the welding device generally designated 2. The edges of the webs F1 and F2 are arranged so that they overlap inside the welding device 2 and at least one of them the web F1 is guided by pressing rollers 33 and 34 which is driven by drive means interconnecting the rollers with one of the wheels 14 of an undercarriage 1 which supports the welding device 2. A feature of the construction is that a rectangular frame 3 of the undercarriage includes longitudinal frame members 8 and 9 and laterally adjustable transverse frame members for rods 10 and 11. A wheel assembly including brackets 12 and 15 and wheels 14 and 17 are secured in spaced locations along the longitudinal frame members 8 and 9.

In accordance with a feature of the invention, a welding device 2 is positioned on the undercarriage 1 on guide elements carried on clamps 25 in the front end and clamps 29 in the rear end and by the welding device 2 itself.

The welding machine comprises an undercarriage 1 and a welding device 2 mounted thereto.

The undercarriage 1 has a rectangular frame 3 which is divided into two essentially U-shaped frame sections 4, 5. The frame sections 4, 5 are made of tubular sections and interconnected by two inserted intermediate parts 6 and several screws 7, their mutual spacing being adjustable. Thus, the frame comprises two lateral rods 8, 9 of constant length and of a front and a rear rod 10, 11, both of which are length adjustable.

Fastened to the rods 8 and 9, are two downwardly projecting brackets 12, or in which a shaft 13 is mounted. A wheel 14 is detachably fastened in the area of each of the two ends of the shaft 13. Mounted to two more brackets 15, 15 which are fastened to the rods 8, 9 is a forkshaped carrier 16 each which can pivot about a vertical axis, and each bracket is equipped with a wheel 17.

Fastened to the front rod 10 is a collect 18 which supports a rod 19. Fastened to the rod 19 is a collet 20 which supports a freely rotating guide roller 21. The shaft 22 of guide roller 21 has a slightly oblique position from the horizontal plane. A U-shaped yoke 24 for handling the welding machine is mounted to the rear rod 11 by means of two collects 23, 23.

Fastened to the front rod 10 are two clamping devices 25 which have a recess 26 on their side facing the rear rod 11. Disposed in each clamping device 25 are two mutually aligned set screws 27 whose ends protrude into the recess 26. Fastened to the rear rod 11 is a clamping device 28 which supports a fish plate 29 projecting in the direction towards the front rod 10.

The welding device 2 involves a heated wedge type hand welding device of conventional design, the housing 30 of which is provided with a guide slot 31, 32 each to accommodate the two foil webs F1, F2 (FIG. 3). The guide slots 31, 32 or so offset relative to each other that the edge zones of the foil webs F1, F2 overlap each other. In the area of the guide slots 31, 32 the foil webs F1, F2 are shown in section. In the area of the heated wedge (not shown), the welding device has two pressure rolls 33, 34, the upper pressure roll 33 being mounted to a pivotable arm 35. To drive both pressure rolls 33, 34, a motor 36 is installed in the housing 30 and connected to a shaft 38 supporting the upper pressure roll 33 via a belt drive 37. The drive connection between motor 36 and lower pressure roll 34 is not shown for the sake of better clarity.

Fastened to the front end of housing 30 are two horizontal fingers 38. Also fastened to the housing 30 is an angle plate 40 supporting a threaded pin 42 which can be clamped by two nuts 41. The welding device 2 can be connected to the undercarriage 1 so that the fingers 39 are clamped between the set screws 27 which are mutually associated in pairs and that the threaded pin 42 is supported by the fishplate 29. By turning the set screws 27 and the threaded pin 42, the installed height position of the welding device 2, and hence its ground clearance, can be varied.

The shaft 38 is connected, via a universal joint coupling, to a shaft 46 mounted in the associated bracket 12. Via chain drive 47 the shaft 46 is in driving connection with the shaft 13 which supports the two wheels 14 so that the wheels 14 and the pressure rolls 33, 34 are driven at the same circumferential speed.

For work to be performed in a horizontal plane the wheels 14, 17 of the undercarriage 1 support the welding machine on the foil webs F1, F2 whose edge zones to be welded together are accommodated in the guide slots 31, 32, are softened by the heated wedge (not shown), and compressed by the pressure rolls 33, 34.

Since due to the mounting of the welding device 2 in the undercarriage 1 it has been achieved that the welding device 2 always is at a distance from a base 60 supporting the foil webs F1, F2 the welding machine is particularly well suited for welding operations in uneven terrain, for instance to line the bottom of garbage disposal sites.

Figure 1:
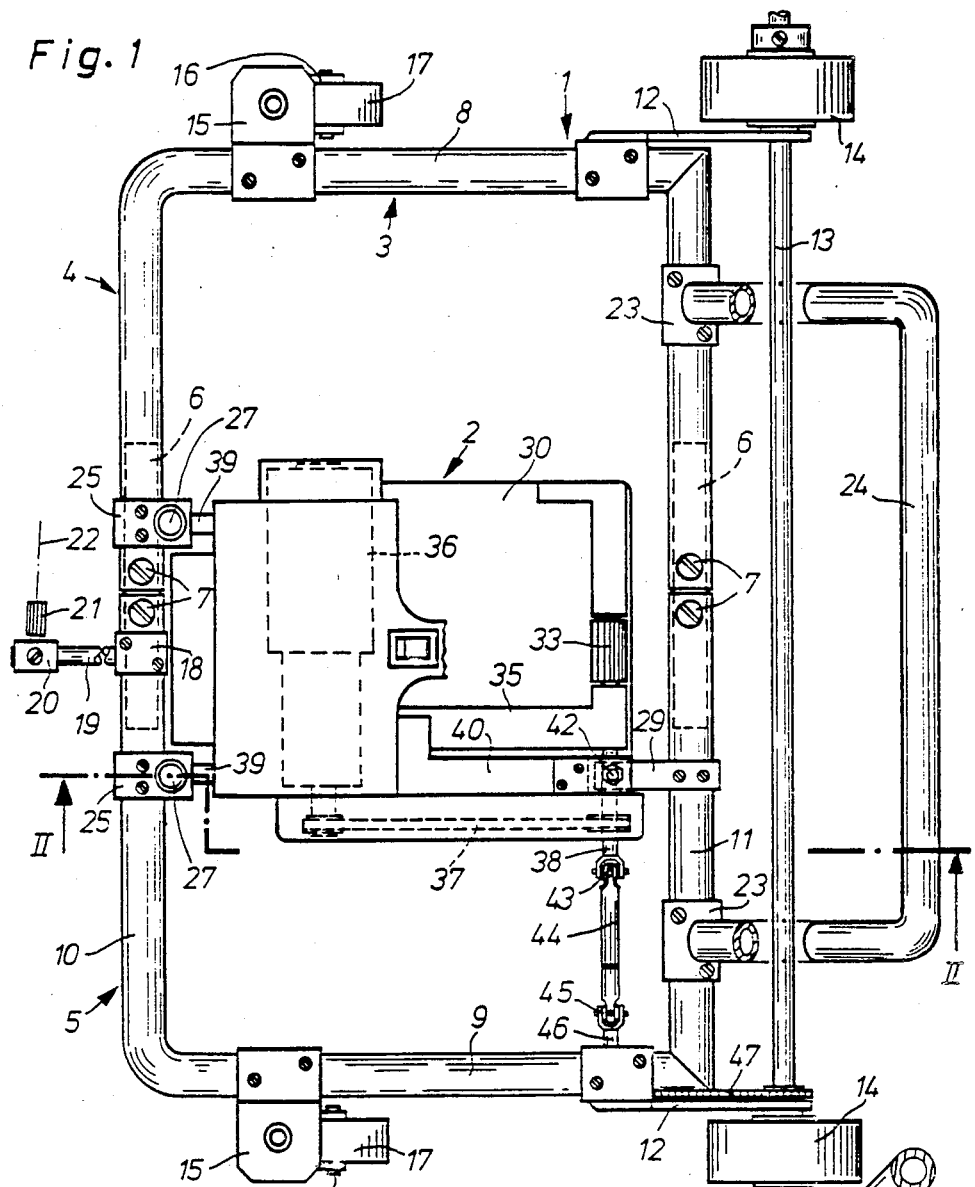
FIG. 1 shows a top plan view of a welding machine constructed in accordance with the invention.
Figure 2:
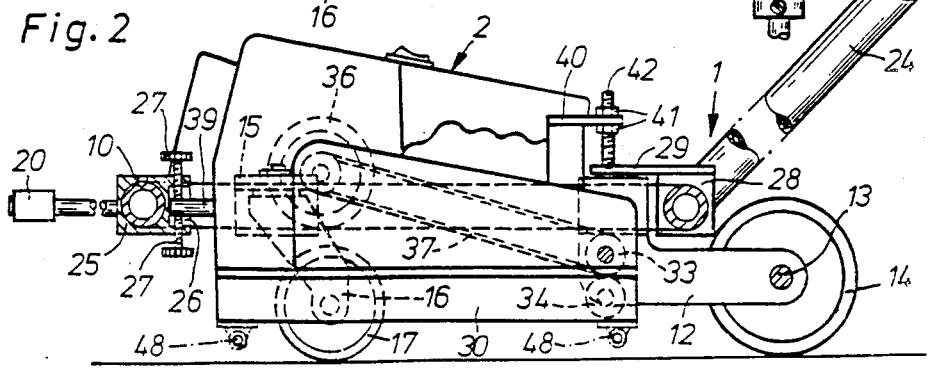
FIG. 2 is a sectional view of the welding machine taken along line II—II of FIG. 1.

Since the welding machine operator must carry its entire weight for work to be performed in a vertical plane or overhead, the welding device 1 is used without the undercarriage 2 in these cases. It may then be expedient to mount on the underside of housing 30 the casters 48 shown in dash-dot lines in FIG. 2, by means of which the welding device 2 can be rolled along the wall behind or above the foil webs.

Figure 4:
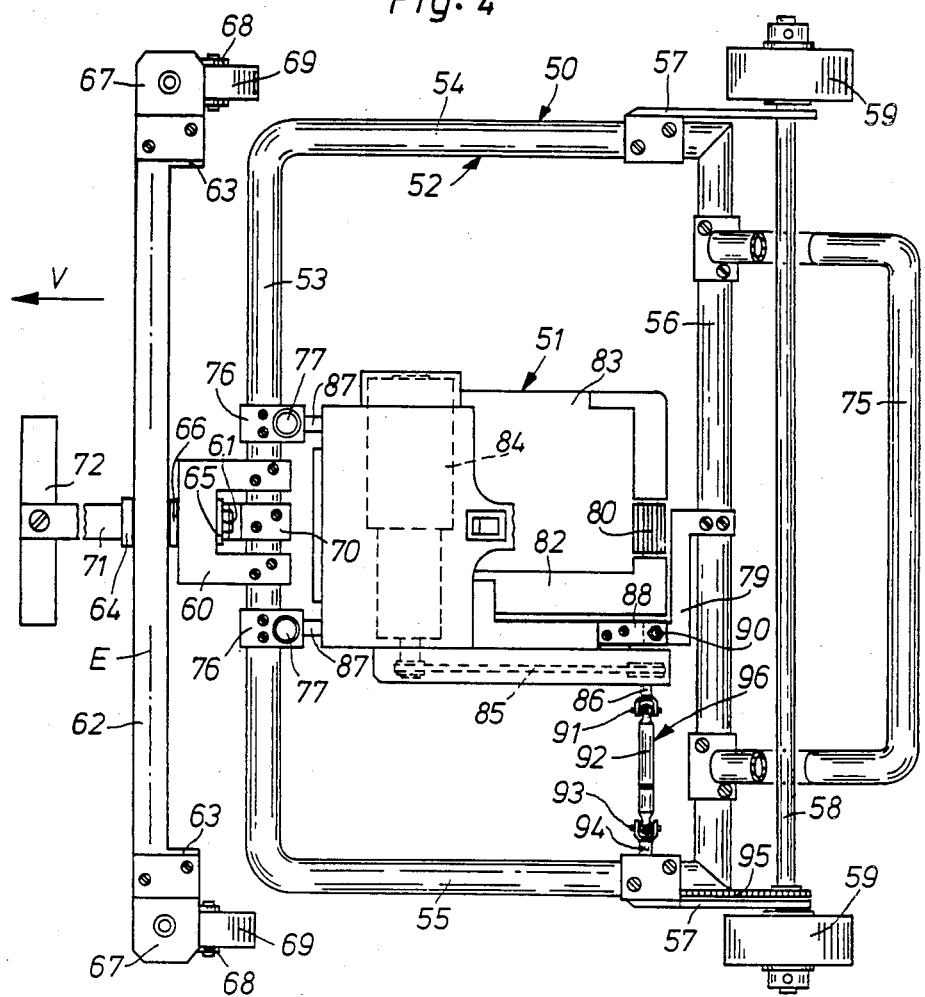
FIG. 4, is a top view onto the welding device of the second embodiment.
Figure 5:
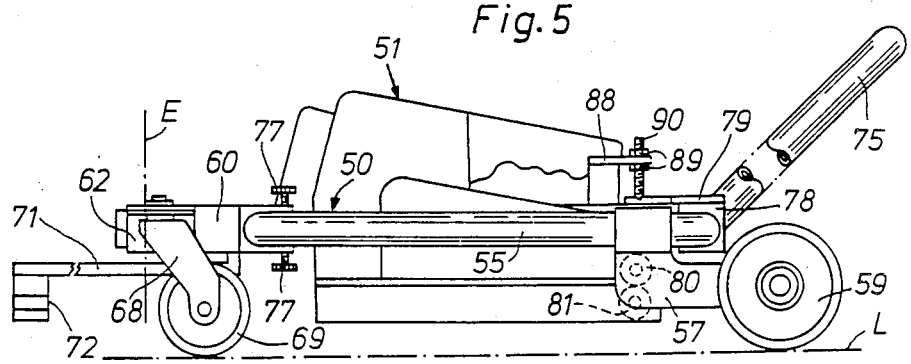
FIG. 5, is a side view of the welding device according to FIG. 4.

The welding device illustrated in FIGS. 4 and 5 is constructed like the above described welding device and therefore consists of a chassis 50 and a welding apparatus 51 arranged thereon.

Chassis 50 has a rectangular frame 52 which consists of a front rod 53, two lateral rods 54, 55 and a rear rod 56.

At the rear rod 56 two downwardly projecting brackets 57 are fastened, in which a shaft 58 is mounted. At each end of shaft 58 a roller 59 is fastened.

At the front rod 53 a U-shaped carrier 60 is fastened, in which a stud 61 is arranged. Pivotably mounted on the stud 61 is a rod-shaped roller carrier 62, with widened end pieces 63. Stud 61 is provided with a head 64 and retained axially by a lock ring 65. On the stud 61, between the carrier 60 and the roller carrier 62, a spacer disk 66 is arranged. At each end piece 63 a bracket 67 is fastened. At the brackets 67 a forked carrier 68 pivotable about a vertical axis is arranged, each carrier 68 being provided with a roller 69.

Figure 8:
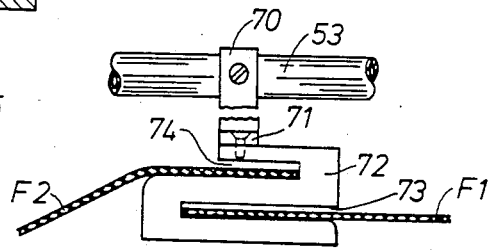
FIG. 8, is an enlarged view of an edge guide for the foil strips.

At the front end 53 a collet 70 is fastened, which carries a rod 71. At rod 71 an edge guide 72 is arranged. The edge guide 72, shown in enlarged front view in FIG. 8, has a slit 73 for lateral guiding of the lower foil strip F1, and a slit 74 for lateral guiding of the upper foil strip F2. At the rear rod 56, a U-shaped stirrup 75 for handling the welding device is fastened by means of two collets 75.

At the front rod 53 are fastened two clamping pieces 76, which are provided on the side toward the rear rod 56 with a cutout not shown. In each clamping piece 76 two mutually aligned set screws 77 are arranged, whose ends protrude into the cutout. At the rear rod 56 a clamping piece 78 is fastened (FIG. 5), which carries a fishplate 79 bent in a horizontal plane.

The welding apparatus 51 is fully equivalent to the welding apparatus 2 of the first embodiment and accordingly has two pressure rollers 80, 81 arranged in the region of the heating wedge not shown, the upper pressure roller 80 being arranged at a pivotable arm 82.

At the front end of housing 83 two horizontally extending fingers 87 are fastened. Further there is fastened at the housing 83 an angle plate 88, which carries a threaded pin 90 clampable by two nuts 89. The welding apparatus 51 is connectable with the chassis in that the fingers 87 are clamped between the set screws 77 correlated with one another in pairs and that the threaded pin 90 takes support on the fishplate 79. By turning the set screws 77 and the threaded pin 90, the installed portion of the welding apparatus 51 as to height and hence its ground clearance can be varied. The welding apparatus 51 is arranged on the chassis 50 in such a way that the front rollers 69 among themselves and likewise the rear rollers 59 among themselves rest on the foil strips F1, F2 with equal force.

Shaft 86 is connected via a universal coupling 91 with a telescoping intermediate shaft 92, which in turn is connected via a universal coupling 93 with a shaft 94 mounted in the associated bracket 57. Shaft 94 is in drive connection via a chain drive 95 with the shaft 58 carrying the two rollers 59 in such a way that the rollers 59 and the pressure rollers 80, 81 are driven at the same circumferential speed. The structural elements 86 and 91 form a transmission device 96.

During work to be carried out in a horizontal plane, the welding device takes support by the rollers 59, 69 of the chassis 50 on the foil strips F1, F2, whose edge sections to be welded together are softened by the heating wedge not shown and are pressed together by the pressure rollers 80, 81.

As it is achieved by the arrangement of the welding apparatus 51 in chassis 50 that the welding apparatus 51 always has a distance from the support carrying the foil strips F1, F2, the welding device is suitable particularly for welding jobs in uneven terrain, for example for lining the bottom of waste deposits. By the arrangement of the front rollers 69 at the roller carrier 62 pivotable in the plane (E) perpendicular to the running plane (L) of the welding device (FIG. 5) the possibility is created that the two front rollers 69 can jointly adapt themselves to the unevennesses transmitted from the support to the foil strips F1, F2, whereby the front rollers 69 among themselves and the rear rollers 59 among themselves have, as in the case of a level support, a substantially equal bearing force. Since at a substantially equal bearing force also the drive movement transmissible from the rear rollers 59 is substantially the same, a direction-stable forward movement of the welding device is obtained also when working in uneven terrain.

If the foil strips F1, F2 to be welded together have edges running in a straight line in the overlap region, and if they are in parallel alignment when the foil strips F1, F2 are laid on, an additional contribution to the directional stability of the forward movement is made by the use of the edge guide 72.

If the foil strips F1, F2 are relatively light and/or flexible, so that they can either be laterally displaced by the edge guide 72 moved forward together with the welding apparatus 51 or can be arched up, the edges of the overlapping foil areas need not be aligned exactly parallel; it suffices if the edges are only approximately parallel. The overlap width must not be smaller than the mutual distance of the vertical guide faces of the slits 73, 74.

EMBODIMENT 3

Figure 6:
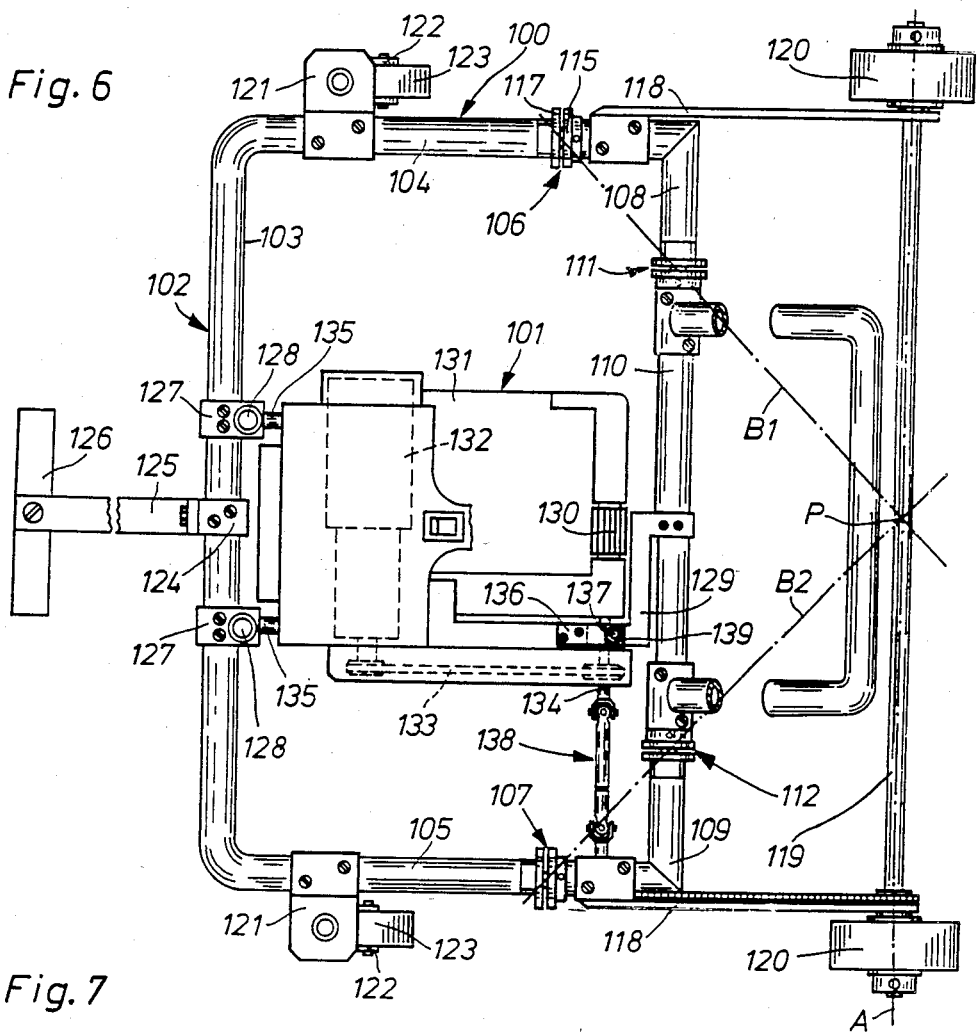
FIG. 6, is a top view onto the welding device of the third embdiment.

The welding device shown in FIG. 6 is constructed similarly as the one shown in FIGS. 4 and 5 and accordingly consists of a chassis 100 and a welding apparatus 101 arranged thereon.

Chassis 100 comprises a U-shaped frame 102 which consists of a front rod 103 and two lateral rods 104, 105. At the ends of the lateral rods 104, 105, two angle pieces 108, 109 are articulated with interposition of a ball joint 106, 107 for each. Between the two angle pieces 108, 109 a rod type central piece 110 is arranged, which is articulatedly connected with the angle pieces 108, 109 via two ball joints 111, 112.

Figure 7:
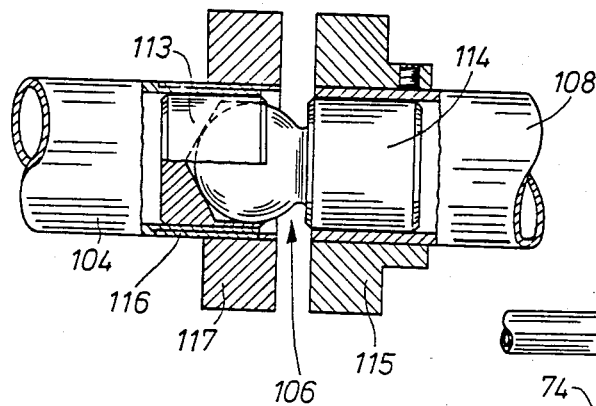
FIG. 7, is an enlarged sectional view of a joint of the welding device of FIG. 6.

The ball joints 106, 107, 111 and 112 are of standard design. As an example, FIG. 7 is a simplified representation of the construction of the ball joint 106. It consists of a socket 113 which is secured in the lateral rod 104 and in which the ball portion of a spherical bolt 114 is received pivotable to all sides but axially secured. The other end of the spherical bolt 114 is fastened in the angle piece 108. On the end of the angle piece 108 a disk type shoulder 115 is fastened. On a male thread 116 provided at the adjacent end of the lateral rod 104 a nut 117 is disposed, which is able to come in contact with the shoulder 115 and thus acts as an adjustable stop limiting the pivot range of the ball joint 106.

At each of the two angle pieces 108, 109 a downwardly projecting bracket 18 is fastened. In the two brackets 118 a shaft 119 is mounted, at whose two ends a roller 120 is fastened. As the two angle pieces 108, 109 carrying shaft 119 with the rollers 120 are articulated to the frame 102 or respectively to the central piece 110 via two ball joints 106, 111 and 107, 112, respectively, they fulfill the function of so-called triangle links.

The two pairs of ball-and-socket joints (106, 111 and 107, 112) on the elbow pieces (108, 109) are so positioned that connecting lines drawn between the ball-and-socket joints (106, 111 and 107, 112) and extended (B1, B2) intersect the longitudinal axis (A) of the shaft (119) at point (P).

At two brackets 121 fastened at the lateral bars 104, 105, a forked carrier 122 pivotable about a vertical axis is arranged, each carrier 122 being provided with a roller 123.

At the front rod 103, an edge guide 126 is arranged by a collet 124 and rod 125.

At the front rod 103 furthermore two clamping pieces 127 are fastened, which are provided on the side toward the central piece 110 with a cutout not shown. In each clamping piece 127, two mutually aligned set screws 128 are arranged, whose ends protrude into the cutout. At the central piece 110, a fishplate 129 bent in a horizontal plane is fastened by a clamping piece, not shown which plate bears on its end a permanently mounted threaded bolt (137) projecting upward.

The welding apparatus 101 fully corresponds to the welding apparatus 51 of the second embodiment and accordingly comprises two pressure rollers disposed in the region of the heating wedge not shown, only the upper pressure roller 130 being shown in FIG. 6. The pressure rollers are driven by a motor 132 installed in housing 131, which motor is connected via a belt drive 133 with a shaft 134 carrying the upper pressure roller 130.

At the front end of the housing 131, two horizontally extending fingers 135 are fastened. Further there is fastened at the housing 131 an angle plate 136 provided with a through hole for a clampable threaded pin 137. The welding apparatus 101 is connectable with the chassis 100 in that the fingers 135 are clamped between the set screws 128 correlated with one another in pairs and by attaching the angle plate 136 by nuts 139 to the threaded pin 137. The welding apparatus 101 is arranged on the chassis 100 in such a way that the front rollers 123 among themselves and likewise the rear rollers 120 among themselves rest on the foil strips with equal force.

The motor 132 drives, via a transmission device 138 which is identical with the transmission device 96 shown in FIG. 4, the shaft 119 in such a way that the roller 120 have the same circumferential speed as the pressure rollers.

By the arrangement of the shaft 119 carrying the rollers 120 at the angle pieces 108, 109 acting as triangle links and by the support of the rear end of the welding apparatus 101 on the central piece 110 articulatedly connected with the angle pieces 108, 109, the possibility is created that the two rear rollers 120 jointly can adapt themselves to the unevennesses transmitting from the support to the foil strips, whereby the front rollers 123 among themselves and the rear rollers 120 among themselves always have a substantially equal bearing force both for level and for uneven supports. In this way it is ensured also for this embodiment that the rear rollers 120 create always a substantially equal drive movement and that therefore a direction-stable forward movement is obtained.

What is claimed is:

1. A welding machine for foil webs which are arranged in overlapping relationship, comprising an undercarriage including a supporting frame and a self contained welding device detachably mounted on said supporting frame, means defined between said welding device and said mounting frame permitting the adjustment of height of said welding device, said mounting frame including a rectangular frame having four wheels, and drive means driving at least one of said wheels.

2. A welding machine according to claim 1, wherein said mounting means includes supporting screws.

3. A welding machine according to claim 1, wherein the wheels are mounted so that the spacing therebetween is changeable.

4. A welding machine according to claim 3, wherein the frame comprises transverse and longitudinally extending rod portions forming a rectangular frame structure, said transverse rod members being extensible and retractable.

5. A welding machine according to claim 4, including a guide roller for the upper foil web mounted on said mounting frame ahead of said welding device.

6. A welding machine according to claim 1, wherein said frame comprises a chassis with said welding device supported on said chassis, said chassis being equipped with four rollers arranged in pairs on each side of said welding device and taking support on said foil strips.

7. A welding machine according to claim 6, wherein said welding device is adjustable in height on said chassis and including bolts for securing said device on said chassis and wherein in at least two rollers are drivable.

8. A welding machine according to claim 6, including at least one roller carrier arranged on one set of said rollers being moveable perpendicularly to the running plane of the welding device relative to said chassis.

9. A welding device according to claim 8, wherein said roller carrier comprises a rod having a joint pin pivotal in a plane perpendicular to the running plane of said welding device and extending crosswise to the forward direction thereof.

10. A welding machine according to claim 6, wherein said rollers are spaced at a variable distance.

11. A welding machine according to claim 6, wherein said chassis comprises a frame formed by rods extending crosswise and lengthwise to the forward direction of said welding device, said transversely extending rods being adjustable in length.

12. A welding device according to claim 6, wherein said chassis has an obliquely set guide roller comprising an upper foil strip.

13. A welding device according to claim 6, wherein said chassis has an edge guide for said foil strips.

14. A welding device according to claim 6, wherein said roller bearers comprise a triangle made up of connecting rods, and including imaginary lines drawn through the joints of said connecting rods and cross to intersect each other at the longitudinal axis of the shaft of said device.

15. A welding machine for welding foil webs which are overlapped, comprising an undercarriage including a rectangular frame having longitudinal frame members and laterally adjustable transverse frame members, a wheel assembly secured to said longitudinal frame members at longitudinally spaced locations for the wheel support of said frame, a welding device positioned on said undercarriage, centering means for centering said welding device on said undercarriage, said welding device having sides with foil receiving guide slots extending inwardly from each side so as to position respective foil ends from each side in overlapping relationship to each other within said welding device, rotatable pressing roller means carried by said welding device engageable with at least one of said foils for guiding said foils during welding, and drive means connected to at least one of said wheels and to said roller means to rotate said rollers.

16. A welding machine according to claim 15, wherein said roller means engages the lower one of said foil webs adjacent the edge thereof and including a guide roller carried by said undercarriage ahead of said welding device engageable with the lower one of the foils.

17. A welding machine according to claim 15, wherein said frame members are formed by two substantially U-shaped hollow tubular frame parts arranged in abutting relationship and a rod member extending into the tubular parts from each end thereof and holding said parts together, means for securing said rod member to said frame part in an adjusted position.

18. A welding machine according to claim 15, including a drive motor carried by said welding device forming part of said drive means, a chain drive connection between said drive motor and at least one of said wheels, and a universal shaft drive connection from said motor to one of said pressing rollers.

19. A welding machine for foil webs which are arranged in overlapping relationship, comprising an undercarriage including a supporting frame and a self contained welding device detachably mounted on said supporting frame, said frame comprising a chassis with said welding device supported on said chassis, said chassis being equipped with four rollers arranged in pairs on each side of said welding device and taking support on said foil strips, at least one roller carrier arranged on one set of said rollers being moveable perpendicularly to the running plane of the welding device relative to said chassis, said roller carrier comprising a rod having a joint pin pivotal in a plane perpendicular to the running plane of said welding device and extending crosswise to the forward direction thereof, said chassis comprising two roller carriers designed as links and a centerpiece arranged between said links and articulatedly connected to said links for supporting said welding device.

20. A welding device according to claim 19, wherein said roller carriers are formed as a triangle.

21. A welding device according to claim 18, wherein said triangle includes joints between the links of said triangle and said chassis is formed by a plug connection comprising a stud and an axially secured sleeve embracing said stud with large radial play.

22. A welding device according to claim 20, wherein said joint arrangements between said triangular links and the chassis are formed by ball joints.

23. A welding device according to claim 22, wherein said pivot range of said ball joints is adjustable.

* * * * *